United States Patent
Vajravel

(10) Patent No.: US 9,760,524 B2
(45) Date of Patent: Sep. 12, 2017

(54) SYSTEM AND METHOD TO REDIRECT UASP MASS STORAGE DEVICES TO AN UNSUPPORTED OPERATING SYSTEM IN A VDI ENVIRONMENT

(71) Applicant: Dell Products L.P., Round Rock, TX (US)

(72) Inventor: Gokul T. Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 14/844,653

(22) Filed: Sep. 3, 2015

(65) Prior Publication Data

US 2017/0068635 A1 Mar. 9, 2017

(51) Int. Cl.
*G06F 3/06* (2006.01)
*G06F 13/42* (2006.01)
*G06F 13/38* (2006.01)
*G06F 13/00* (2006.01)

(52) U.S. Cl.
CPC ........ *G06F 13/4282* (2013.01); *G06F 3/0619* (2013.01); *G06F 3/0665* (2013.01); *G06F 3/0689* (2013.01); *G06F 13/387* (2013.01)

(58) Field of Classification Search
None
See application file for complete search history.

(56) References Cited

U.S. PATENT DOCUMENTS

| | | | |
|---|---|---|---|
| 8,010,630 B2 | 8/2011 | Barreto et al. | |
| 2011/0296106 A1* | 12/2011 | Yen | G06F 13/4295 711/115 |
| 2017/0068627 A1 | 3/2017 | Vajravel | |

OTHER PUBLICATIONS

USB host-side drivers in Windows by Microsft at <<https://msdn.microsoft.com/en-in/library/windows/hardware/hh406256(v=vs.85).aspx#usb_3.0_host_controller_driver_usbxhci.sys>>, 6 pages, 2015.
Architecuture: USB host controller extension (UCX) by Microsoft at <<https://msdn.microsoft.com/en-us/library/windows/hardware/mt187813(v=vs.85).aspx>>, 3 pages, 2015.
Universal Serial Bus Mass Storage Class Bulk-Only Transport, Revision 1.0, Sep. 31, 1999, 22 pages.
USB Attached SCSI from Wikipedia, the free encyclopedia, printed Apr. 4, 2017, 3 pages.
USB Attached SCSI (UAS) Best Practices for Windows 8, at https://msdn.microsoft.com/en-us/library/windows/hardware/Dn642113.aspx, printed Apr. 4, 2017, 1 page.

* cited by examiner

*Primary Examiner* — Scott Sun
(74) *Attorney, Agent, or Firm* — Baker Botts L.L.P.

(57) ABSTRACT

In certain information handling system environments, universal serial bus (USB) attached small computer interface (SCSI) protocol (UASP) devices may be connected to a client and redirected to a server or other information handling system. Some operating systems (OS) of a server may not support UASP. Rather than installing non-certified or expensive third party software, a virtual disk enumerator may retrieve the relevant information of the redirected UASP device and determine that all requests to the virtual UASP device must be redirected to the disk stack of the client for processing.

20 Claims, 6 Drawing Sheets

SYSTEM AND METHOD TO REDIRECT UASP MASS STORAGE DEVICES TO AN UNSUPPORTED OPERATING SYSTEM IN A VDI ENVIRONMENT

TECHNICAL FIELD

This disclosure generally relates to supporting unsupported universal serial bus (USB) attached small computer system interface (SCSI) protocol (UASP) devices by allowing a complete build of the disk stack at the client and redirecting requests at the server for the redirected UASP device to the disk stack at the client.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

Classic universal serial bus (USB) storage device technology utilized in VDI environments emulated virtual USB hardware on a virtual USB bus driver on an information handling system, such as a server. The classic USB storage devices adhered to the USB mass storage—bulk only transport (BOT) specification/protocol. This protocol is supported by earlier version of operating systems (OS) such as Windows 98, Windows XP, and those known to one of ordinary skill in the art.

Due to inherit limitations in this prior USB protocol, a new protocol known as USB attached small computer system interface (UASP). This new protocol is defined across two standards, the T10 "USB attached SCSI" (T10/2095-D) referred to as the "UAS" specification, and the USB "universal serial bus mass storage class—USB attached SCSI protocol (UASP)" specification. One problem is that such high performance UASP storage devices or disks are supported only by Windows 8 and Windows Server 2012.

For many reasons, the OS of a server may not be upgraded to a newer or current version of an OS. Third party or vendor specific hub drivers will need to be installed on servers that do not support the UASP storage devices. These hub drivers may not be certified or might not even be supported by the OS. Additionally, installing such drivers may lead to instability of the overall system by, for example, requiring multiple vendor-specific software that may require additional training or support introducing greater expense and introducing bugs or security holes into the system environment. Further, these third party UASP drivers will not function properly if the UASP storage device is coupled to a USB 2.0 port or hub. The present disclosure provides systems and methods to address this problem.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
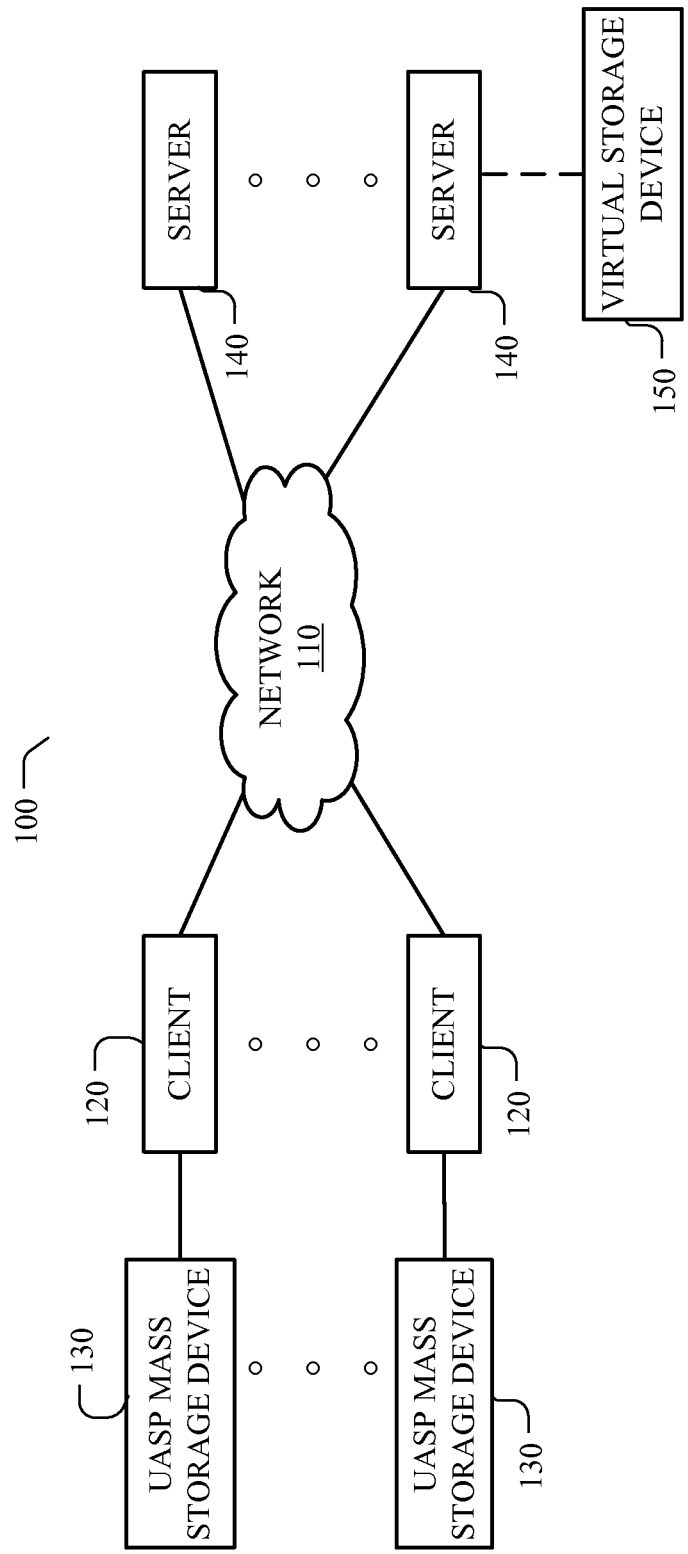
FIG. 1 illustrates an example configuration of networked information handling systems according to one embodiment of the present disclosure.

This disclosure generally relates to remote computing and, in particular, relates to providing a system and method for redirecting a universal serial bus (USB) attached small computer interface (SCSI) protocol (UASP) storage device from a client that supports the UASP mass storage device version to a server with an operating system (OS) that does not support the appropriate protocol for the redirected UASP mass storage device. For example, UASP is natively supported only from Windows 8 (for desktop editions) and Windows Server 2012 (for server editions). For the older operating systems, such as Windows 7, the end-user or administrator has to install paid third party or vender-specific UASP hub drivers. These UASP hub drivers may not be certified and also may not be supported by OS. Adding and installing uncertified drivers in an information handling system may bring down the system stability, infect a system with bugs, create security holes, increase expense, and any other number of issues known to one of ordinary skill in the art.

However, loading the virtualized UASP device as a generic SCSI device and redirecting requests to the virtual UASP device to the disk stack at the client provides several benefits. First, such a design supports using UASP mass storage devices at a server having an older version of an OS without having to install any third party drivers. Given a proper network, the data transfer can scale up to UASP supported speed and bandwidth. The design is oblivious to the USB hub/controller type and bus speed, supports large data transfer and functions appropriately for any remoting protocols.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to UASP mass storage devices, USB printers, scanners, USB storage devices, flash drives and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a UASP mass storage device is connected to a given client via a standard USB connection, the locally connected UASP mass storage device may be redirected to the server. The redirected UASP mass storage device may then be installed locally for use by any number of clients. The server treats the UASP mass storage device as a virtual device attached to the server.

FIG. 1 at 100 illustrates an example configuration of a networked information handling system. In particular embodiments, one or more clients 120 and one or more servers 140 are connected via network 110. Network 110 may be a WAN, local-area network (LAN) or any other type of network known to one of ordinary skill in the art. Many types of peripheral devices may be connected locally to the client 120. As shown in FIG. 1, in some embodiments, one or more UASP mass storage devices 130 connect to the client 120. According to the present disclosure, one or more UASP mass storage devices 130 may appear to one or more of servers 140 as if they are locally installed on and connected to those servers 140. In certain embodiments, these UASP mass storage devices 130 may be redirected such that they appear to be locally installed or locally shared with another client 120. In one embodiment, the Dell Wyse TCX USB Virtualization is used to virtualize the UASP mass storage device 130. In one or more embodiments, one or more UASP mass storage devices 130 may be virtualized as virtual storage device 150 at a server 140.

Figure 2:
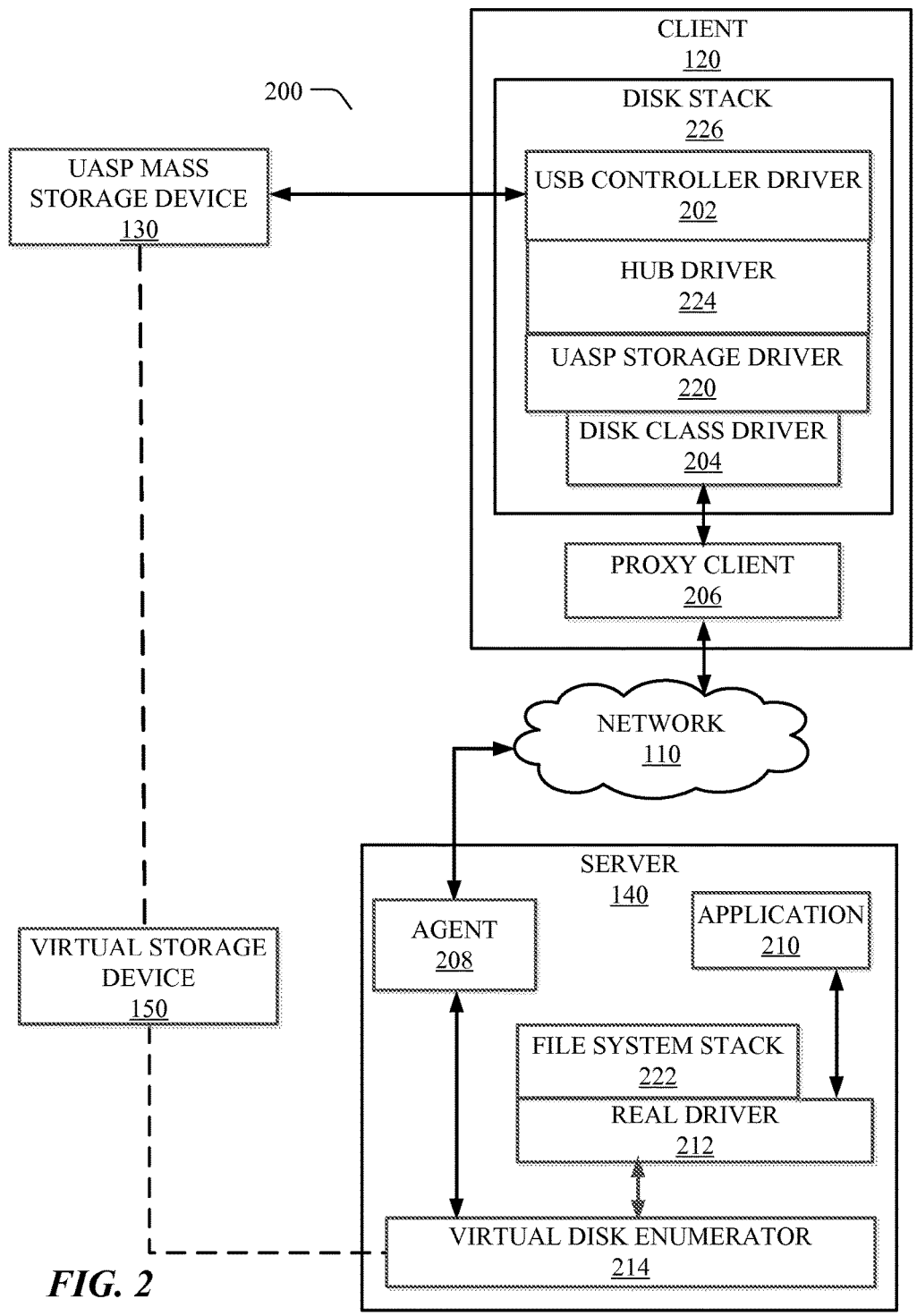
FIG. 2 illustrates an example system of a networked client and server according to one embodiment of the present disclosure.

FIG. 2 at 200 illustrates an example embodiment of a system configured to redirect a UASP mass storage device 130, for example, a UASP hard disk drive (HDD), UASP thumb drive or any other UASP mass storage device known to one of ordinary skill in the art. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

In particular embodiments, client 120 connects to server 140 via network 110. In one embodiment, network 110 may be a WAN network. In other embodiments, network 110 may be a LAN network or any other type of network known to one of ordinary skill in the art. Network 110 may also be a high latency network.

When a UASP mass storage device 130 is initially connected to client 120, client 120 may attempt to initialize UASP mass storage device 130 by attempting to load a USB controller driver 202 and USB hub driver 224. According to the present disclosure, client 120 may determine (or may permit a user to determine) whether to redirect a UASP mass storage device 130 upon connection or coupling of the UASP mass storage device 130 to a client 120 as part of the initialization of the UASP mass storage device 130. In particular embodiments, client 120 may make a new determination regarding the installation of UASP mass storage device 130 after UASP mass storage device 130 has been initialized. For example, a user may decide that the UASP mass storage device 130 that was previously installed on its local client 120 should be redirected to server 140. Client 120 may be configured to automatically install all or only certain UASP mass storage devices 130 locally, may be configured to automatically redirect all or certain UASP mass storage devices 130 to server 140, or may be configured to request input from a user of client 120 or from another source to determine whether to install a particular UASP mass storage device 130 locally or to redirect it.

If a UASP mass storage device 130 is configured to be redirected to server 140, the redirection may operate generally as described in U.S. Pat. No. 8,010,630 to Barreto, et al., which is incorporated herein by reference. A proxy client 206 on client 120 may coordinate communications between UASP mass storage device 130 and an agent 208 running on server 140. In particular proxy client 206 may be configured to receive socket connection information from server 140 and initiate redirecting I/O transactions between UASP mass storage device 130 and agent 208. Agent 208 may be configured to register with the OS of client 120 to receive notification of an establishment of any remote access connection. In one embodiment, proxy client 206 may be configured to receive socket connection information from agent 208 of server 140 and initiate redirecting I/O transactions to and from UASP mass storage device 130 to agent 208 on server 140.

In one or more embodiments, client 120 includes a USB controller driver 202 layered on top of a hub driver 224 layered on top of a UASP storage driver 220 layered on top of a disk class driver 204. The USB controller driver 202, a UASP storage driver 220, a hub driver 224 and a disk class driver 204 may form a stack at client 120.

In one embodiment, the USB controller driver 202 is a USB version 3.0 controller driver and UASP mass storage device 130 may utilize USB version 3.0, a USB version 3.1 device or any other USB protocol known to one of ordinary skill in the art. USB controller driver 202 communicates transaction requests to and receives responses from UASP mass storage device 130. USB controller driver 202 and UASP storage driver 220 handle the USB host controller functionalities, for example, discovering USB hubs attached to the USB controller driver 202.

USB hub driver 224 manages the attached USB hubs of the client 120 and discovers any attached UASP mass storage devices 130 to the client 120. The USB hub driver 224 advertises its capabilities to the OS of the client 120 so that if any UASP mass storage device 130 having a supported USB version is attached to the client 120 the UASP mass storage device 130 will operate to its full capabilities. For example, in one embodiment UASP mass storage device 130 utilizes USB version 3.0 and USB hub driver 224 is a USB 3.0 hub driver. In this embodiment UASP mass storage device 130 will operate to the full capabilities associated with USB version 3.0, for example, with respect to speed, error-recovery, bandwidth and any other USB version 3.0 capabilities known to one of ordinary skill in the art.

Proxy client 206 communicates to disk class driver 204 a request regarding redirection of the USB device 130. Proxy client 206 obtains exclusive access to the UASP mass storage device 130 for redirection of UASP mass storage device 130 such that no other application may access the UASP mass storage device 130. In one embodiment, client proxy 206 sends to agent 208 one or more parameters, metadata, and any other information known by one of ordinary skill in the art related to UASP mass storage device 130 that may be used to initialize virtual storage device 150. For example, client proxy 206 may send to agent 208 the USB version of the UASP mass storage device 130. A complete disk stack 226 is built for the UASP mass storage device 130 except that a volume and file system stack are not loaded.

Virtual disk enumerator 214 receives information about UASP mass storage device 130 that is to be redirected from agent 208. The OS (such as the Windows OS) loads the real driver 212 associated with the virtual storage device 150, to complete the initialization of the virtual storage device 150 on server 140. The virtual storage device 150 is virtualized as a generic SCSI disk. In one embodiment, during the initialization of the virtual storage device 150, virtual disk enumerator 214 advertises the device capabilities of the virtual storage 150. The real driver 212 has only physical disk level information, for example sectors, so only raw (sector-level) read/write requests are possible. For file level operations, a file system is required, for example new technology file system (NTFS), file allocation table (FAT), FAT32, ex-FAT, or any other file system known to one of ordinary skill in the art. File system stack 222 allows for file level operations like file read, write, rename, delete, etc. on the virtual storage device 150.

The virtual storage device 150 associated with the UASP mass storage device 130 then functions as if the UASP mass storage device 130 was locally connected to server 140 (as indicated by the dashed line between UASP mass storage device 130 and virtual storage device 150). The virtual storage device 150 may thus be made available to application 210 running on server 140, which treats the virtual storage device 150 as a local device.

The application 210 may make requests to access one or more virtual storage devices 150. These requests are translated as storage requests (read/write requests) directed to the virtual storage device 150 at the server 140. The virtual disk enumerator 214 redirects the requests to the disk stack 226 of the client 120 where the associated UASP mass storage device 130 is located. These requests from the server 140 are transmitted to the UASP mass storage device 130 via a proxy client 206. The proxy client 206 transmits the requests to a disk class driver 204 which transmits the requests to the UASP mass storage device 130 via USB controller driver 202. The responses from the USB device 130 are transmitted back to the server 140 via agent 208 and pumped to the virtual disk enumerator 214. The virtual disk enumerator 214 passes the responses back to the respective applications 210 via the real driver 212. Application 210 may be one or more applications and may be one or more virtual applications.

Figure 3:
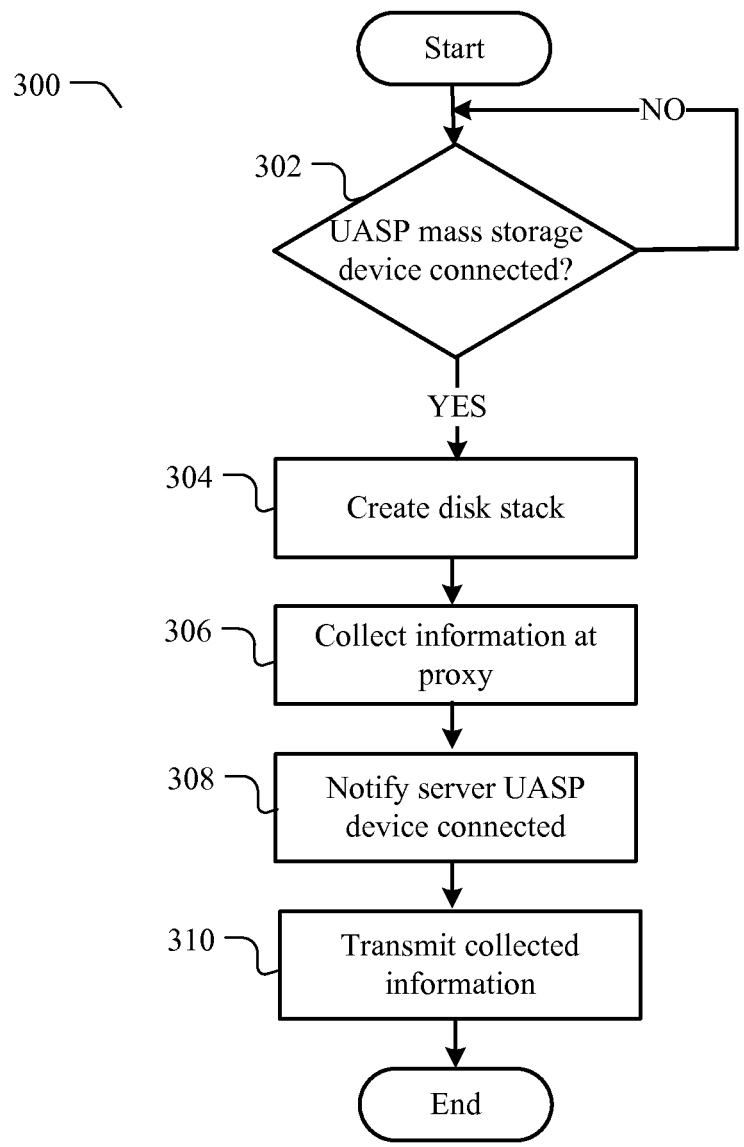
FIG. 3 illustrates an example of steps involved in one method according to one embodiment of the present disclosure.

FIG. 3 is a flow chart in accordance with an embodiment of the present disclosure, shown generally at 300, relating to redirecting a UASP mass storage device 130 at client 120 to a server 140. At step 302, the client 120, via proxy client 206, polls to determine if a UASP mass storage device 130 has been connected to client 120. Proxy client 206 may determine if a UASP mass storage device 130 is connected by any process known to one of ordinary skill in the art. For example, in one embodiment a user may use a graphical user interface (GUI) to inform the client 120 that a UASP mass storage device 130 has been connected. In another embodiment, the client 120 may automatically detect without user intervention the connection of a UASP mass storage device 130. UASP mass storage device 130 may be any known device including, but not limited to, a UASP thumb drive, a UASP HDD, UASP flash drive or any other UASP device known to one of ordinary skill in the art that can be coupled to the client 120 via a USB. Client 120 may poll for a connection in any way known to one of ordinary skill in the art, including, but not limited to, waiting on an interrupt, timer, semaphore, etc. that indicates connection of a UASP device such as UASP mass storage device 130.

If a UASP mass storage device 130 is not detected at step 302, then the method may continuously poll at step 302 as described above until a UASP mass storage device 130 is detected. For example, the method may poll according to a timer, signal, semaphore or automatically as known to one of ordinary skill in the art, wait for user intervention, or any other way known to one of ordinary skill in the art. If a UASP mass storage device 130 is connected to the client 120 as determined at step 302, then at step 304, the OS of the client 120 creates a disk stack 226 associated with the UASP mass storage device 130. The disk stack 226 includes a USB controller driver 202, a UASP storage driver 220, a hub driver 224 and a disk class driver 204. Because the UASP storage driver 220 is kept at the client 120, the OS of the server 140 is not aware of the UASP protocol and any corresponding transactions. At step 306, the proxy client 206 collects the information, if any, associated with the UASP mass storage device 130. For example, in one embodiment, once the UASP mass storage device 130 is connected to the client 120, the proxy client 206 checks to see the UASP version associated with the UASP mass storage device 130 and collects this information and stores the information internally. For example, UASP mass storage device 130 may use UASP version 3.0.

At step 308, the client 120 notifies the server 140 that UASP mass storage device 130 is connected to client 120. In one embodiment, the UASP mass storage device 130 of client 120 sends a request via proxy client 206 to the server 140 via agent 208 to request that the server 140 create a virtual storage device 150 corresponding to the UASP mass storage device 130. In another embodiment, the server 140 receives a device plug-in notification from the client 120 that a UASP mass storage device 130 has been connected to client 120. The server 140 may then determine if one or more applications 210 need access to the UASP mass storage device 130 and if so the server 140 creates a virtual storage device 150 corresponding to the UASP mass storage device 130. In another embodiment, the server 140 automatically virtualizes the UASP mass storage device 130 any time the server 140 receives a notification from a client 120 that a UASP mass storage device 130 has been connected. In other embodiments, the server 140 may only automatically redirect the UASP mass storage device 130 upon notification if the UASP mass storage device 130 is determined to be of a predetermined type based on one or more of the one or more parameters received along with the device plug-in notification. For example, the type may be a UASP thumb drive, UASP HDD, or any other type of UASP device known to one of ordinary skill in the art. The predetermined type may be stored as a setting in memory, set via a GUI, or any other way known to one of ordinary skill in the art. In another embodiment, the server 140 may only redirect the UASP mass storage device 130 when requested by an application 210. Redirection of UASP mass storage device 130 may further be redirected according to any other ways, processes or methods known to one of ordinary skill in the art.

At step 310, the collected information associated with UASP mass storage device 130 is transmitted from the client 120 via proxy client 206 to the server via agent 208. In one embodiment, the information may be transmitted with the device plug-in notification sent at step 308. The information may include UASP version, device type, serial number, identification number, manufacturer identification number or any other parameter known to one of ordinary skill in the art.

Figure 4:
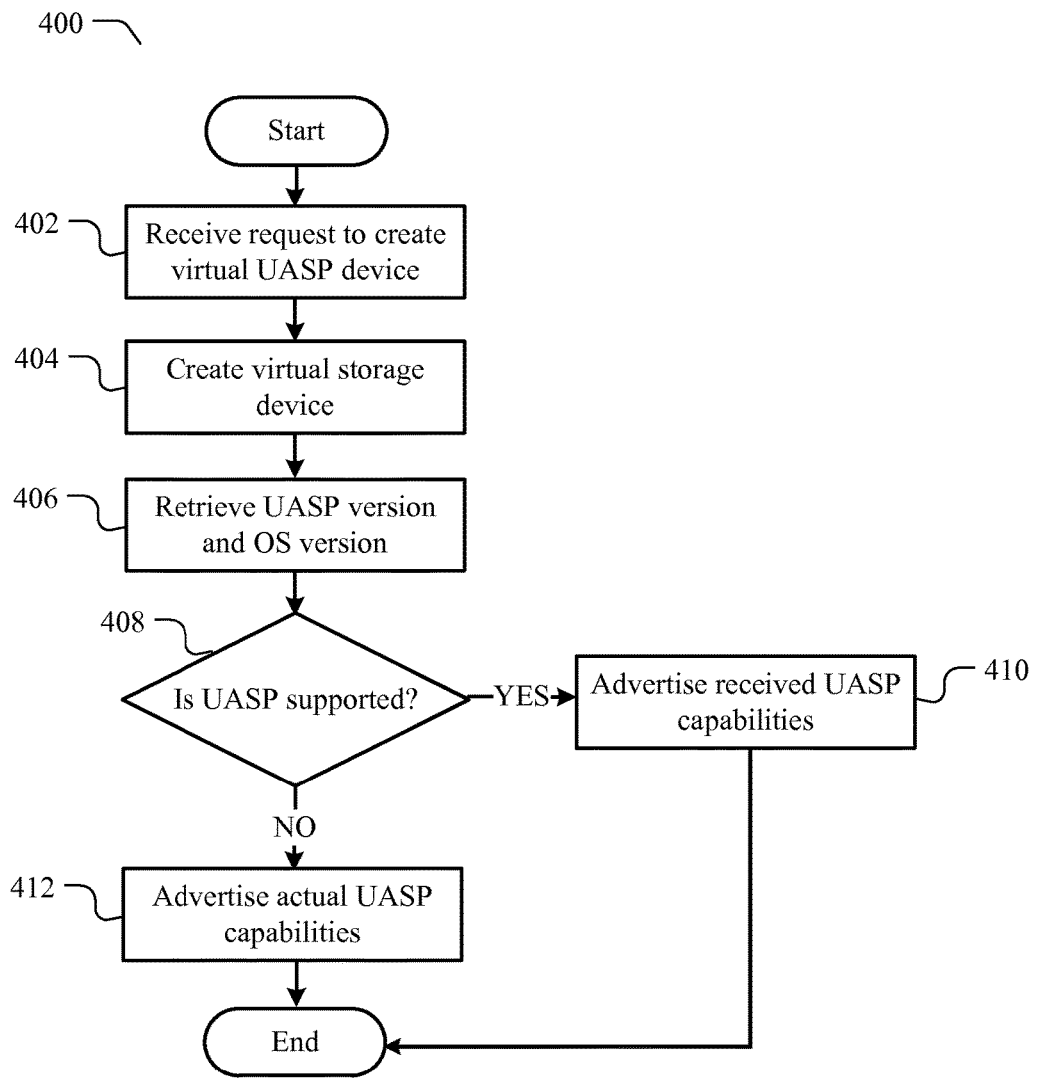
FIG. 4 illustrates an example of steps involved in one method according to one embodiment of the present disclosure.

FIG. 4 is a flow chart in accordance with one embodiment of the present invention shown generally at 400. At step 402, the server 140 receives a notification (for example, a device plug-in notification) from the client 120 that a UASP mass storage device 130 is ready for virtualization such that it can be accessed from one or more applications 210. The notification is sent from the proxy client 206 to the agent 208. Information, including, for example, metadata and one or more parameters, associated with the UASP mass storage device 130 are received with the device plug-in notification.

At step 404, the agent 208 issues a command, for example, an I/O control (IOCTL) command or any other such command known to one of ordinary skill in the art for the virtual disk enumerator 214 to create the virtual storage device 150. The virtual storage device 150 is created based, at least in part, on the notification, for example, based on the information such as metadata and the one or more parameters or any combination thereof. The virtual disk enumerator 214 calls the real driver 212 to complete the initialization of the virtual UASP mass storage device 150 based on the UASP device type enumerated by the virtual disk enumerator 214.

At step 406 the virtual disk enumerator 214 retrieves from the agent 208 the UASP version associated with the UASP mass storage device 130 that has been redirected as virtual USB device 150 and the version of the OS of server 140. This UASP version associated with the UASP mass storage device 130 is sent by the proxy client 206 to agent 208. The agent 208 caches this UASP version. At step 408 it is determined by the virtual disk enumerator 214 if the cached UASP version associated with the virtual storage device 150 is supported by the version of OS of the server 140. The virtual disk enumerator 214 may query, for example via an application programming interface (API), the OS of the server 140 for the UASP version supported by the OS. The virtual disk enumerator 214 compares the OS supported UASP version with the retrieved UASP version. In one embodiment, steps 406-408 are not be executed as only a single UASP version exists and it is only required to retrieve the version of the OS of the server 140. For example, the version of the OS is compared to a supported UASP version. The supported UASP version may be stored in a variable, a table, a linked list or in any other way known to one of ordinary skill in the art. In another embodiment, the version of the OS is compared to a list of OS versions that support UASP. For example, the OS versions that support UASP may be stored in a table, a linked list or in any other way known to one of ordinary skill in the art. In another embodiment, it is contemplated that multiple versions of UASP may exist and that a given OS may not support an earlier UASP version but may support a later UASP version.

If the retrieved UASP version is supported, then at step 410 the virtual disk enumerator 214 advertises to the OS of the server 140 the capabilities of the virtual storage device 150 as the actual capabilities associated with the retrieved UASP version of the virtual storage device 150. If the retrieved UASP version is not supported by the OS of the server 140, then at step 412 the virtual disk enumerator 214 advertises a UASP version to the OS of the server 140, where the advertised UASP version is based, at least in part, on the capabilities associated with a UASP version that is supported by the OS of the server 140. In one embodiment, the advertised version is based, at least in part, on the most recent version that is supported by the OS of the server 140. For example, the version with the latest release date. In another embodiment, the advertised version is based, at least in part, on the UASP version supported by the OS that has the most capabilities in common with the retrieved (or actual) UASP version. All requests from an application 210 to virtual storage device 150 will be handled by the virtual disk enumerator 214 in compliance with the advertised UASP version. The OS only uses requests or commands in compliance with the advertised UASP version.

At step 412, it is determined that the UASP version is supported. The UASP capabilities of UASP mass storage device 130 are mimicked by the OS of the server 150. That is, the I/O queue depth for virtual storage device 150 is equal to the number of I/O streams in USB mass storage device 130. In one embodiment, steps 408-412 are not executed but rather the OS simply mimics the UASP capabilities of the USB mass storage device 130 in the virtual storage device 150.

Figure 5:
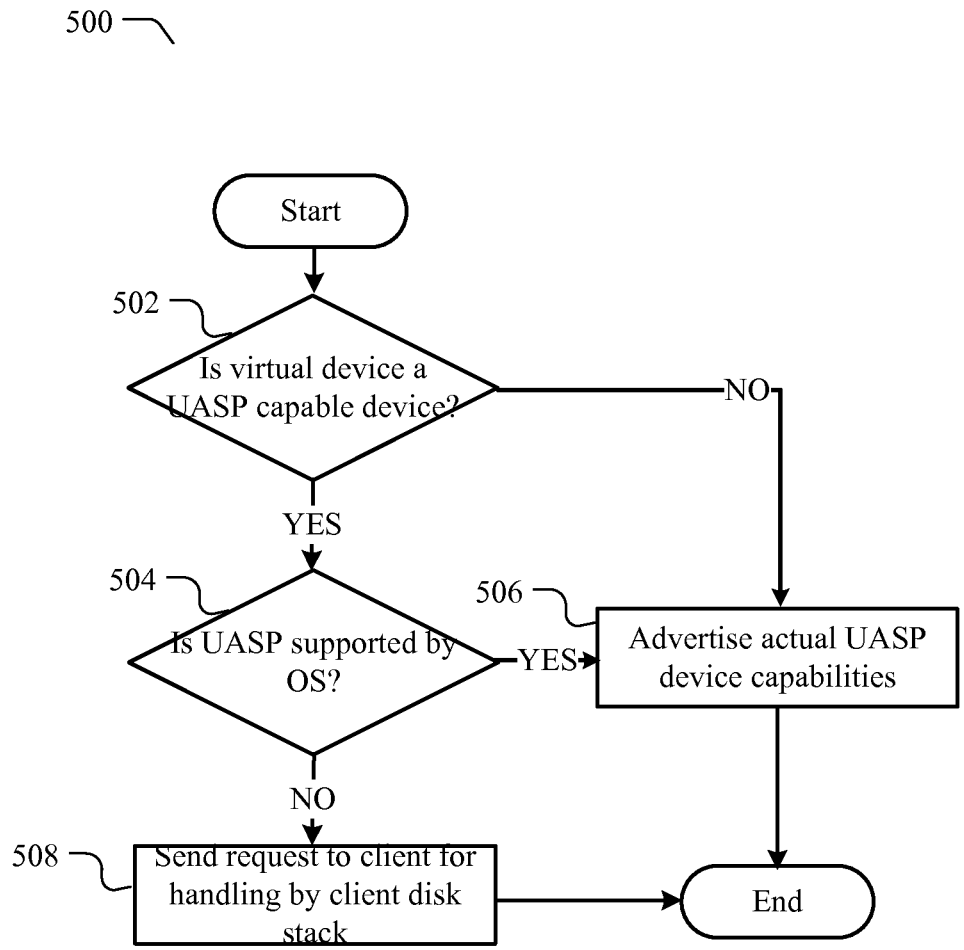
FIG. 5 illustrates an example of steps involved in one method according to one embodiment of the present disclosure.

FIG. 5 is a flowchart in accordance with one embodiment of the present invention shown generally at 500. At step 502, the virtual disk enumerator 214 determines if the redirected UASP mass storage device, virtual storage device 150, is a UASP capable device. Only certain versions of an OS system, such as Windows, support UASP. For example, only Windows 8 (for desktop editions) and Windows Server 2012 (for server editions) and later support UASP devices. Older OS versions, such as Windows 7, do not support UASP devices.

If the version associated with the received notification is not for a UASP device, then at step 506 the virtual disk enumerator 214 advertises to the OS of the server 140 that the virtual storage device 150 (and in this embodiment, it would simply be a virtual USB device) is the actual USB version of the virtual storage device 150 and the virtual storage device 150 will be made available to the OS and to applications 210 as a USB device having the capabilities associated with the actual USB version of the virtual storage device 150.

If the version associated with the virtual storage device 150 is a UASP version, then at step 504, the virtual disk enumerator 214 determines if the OS of the server 140 supports UASP. In one embodiment, the virtual disk enumerator 214 determines if the OS supports the UASP version by executing a query using an API that obtains the OS supported UASP version. If the OS supports the version then the process continues at step 506 with the virtual disk enumerator 214 advertising to the OS of the server 140 that the virtual storage device 150 has the capabilities associated with UASP. If the OS does not support UASP, then at step 508 the virtual disk enumerator 214 advertises to the OS of the server 140 that all requests to the virtual storage device 150 should be transmitted via agent 208 and proxy client 206 to the disk stack 226 of the client 120. Thus, all requests received by the virtual USB bus driver 214 will be handled appropriately according to the advertised version.

Figure 6:
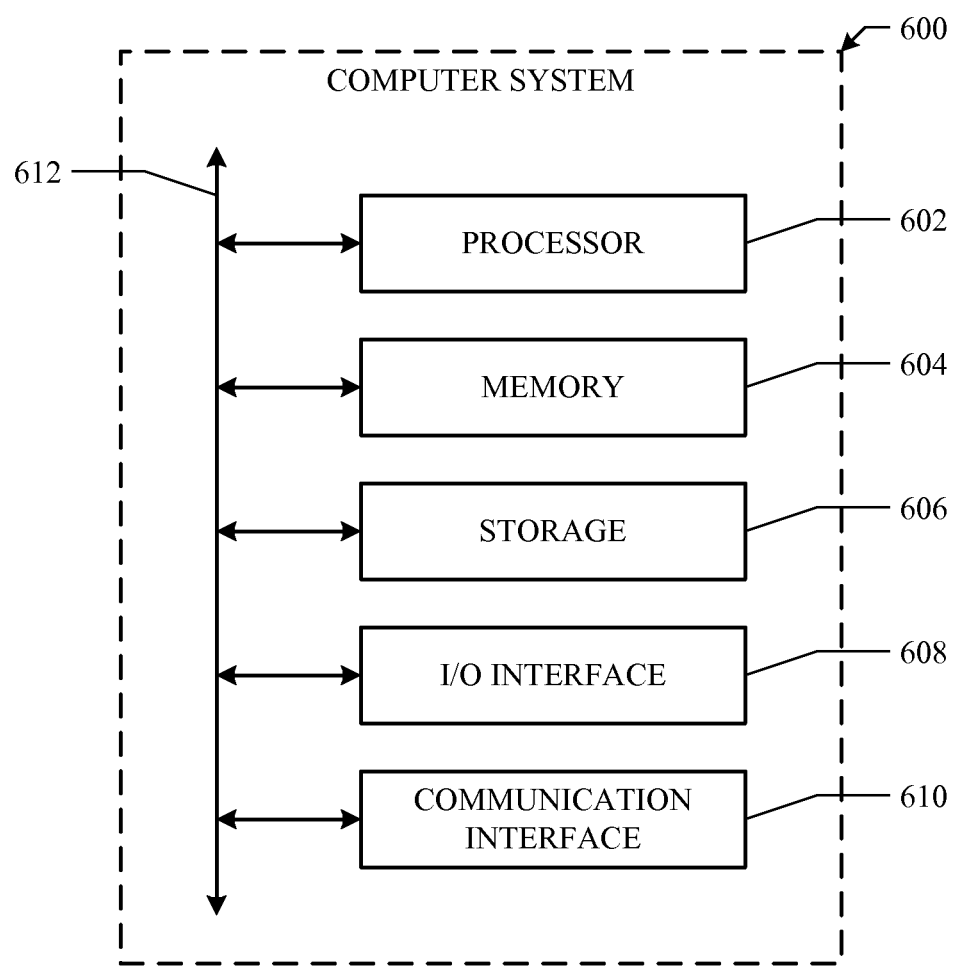
FIG. 6 illustrates an example computing system according to one embodiment of the present disclosure.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an I/O interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes RAM. This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes for data or instructions. As an example and not by way of limitation, storage 606 may include a HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), HDDs, hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at an agent of a server, a notification that a universal serial bus (USB) attached small computer system interface (SCSI) protocol (UASP) device (UASP device) has been connected to a client, wherein the notification comprises a client device UASP version associated with the UASP device;
creating by the agent a virtual storage device associated with the UASP device;
retrieving an operating system version;
determining if the operating system supports UASP; and
advertising to the operating system by a virtual disk enumerator that the virtual storage device has one or more capabilities associated with an advertised UASP version, wherein the advertised UASP version is based, at least in part, on the supported UASP version.

2. The method of claim 1, wherein the determination is based, at least in part, on comparing the operating system version to a list of operating systems that support UASP.

3. The method of claim 1, further comprising:
handling by the virtual disk enumerator requests to the virtual storage device in compliance with the advertised UASP version.

4. The method of claim 1, further comprising:
retrieving by the virtual disk enumerator from the agent the client device UASP version.

5. The method of claim 4, wherein the determination is based, at least in part, on comparing the client device UASP version to a UASP version supported by the operating system.

6. The method of claim 1, wherein the supported UASP version is retrieved via an application programming interface.

7. The method of claim 1, wherein the advertised UASP version is an older version than the retrieved client device UASP version.

8. A system comprising:
a server;
one or more central processing units for processing information of the server;
a memory of the first server communicatively coupled to the one or more central processing units; and
one or more modules that comprise instructions stored in the memory, the instructions, when executed by the one or more processing units, operable to perform operations comprising:
receiving, at an agent of the server, a notification that a universal serial bus (USB) attached small computer system interface (SCSI) protocol (UASP) device (UASP device) has been connected to a client, wherein the notification comprises a client device UASP version associated with the UASP device;
creating by the agent a virtual storage device associated with the UASP device;
retrieving an operating system version;
determining if the operating system supports UASP; and
advertising to the operating system by a virtual disk enumerator that the virtual storage device has one or more capabilities associated with an advertised UASP version, wherein the advertised UASP version is based, at least in part, on the supported UASP version.

9. The system of claim 8, wherein the determination is based, at least in part, on comparing the operating system version to a list of operating systems that support UASP.

10. The system of claim 8, wherein the instructions further operable to perform operations comprising:
handling by the virtual disk enumerator requests to the virtual storage device in compliance with the advertised UASP version.

11. The system of claim 8, wherein the instructions further operable to perform operations comprising:
retrieving by the virtual disk enumerator from the agent the client device UASP version.

12. The system of claim 11, wherein the determination is based, at least in part, on comparing the client device UASP version to a UASP version supported by the operating system.

13. The system of claim 8, wherein the supported UASP version is retrieved via an application programming interface.

14. The system of claim 8, wherein the advertised UASP version is an older version than the retrieved client device UASP version.

15. One or more computer-readable non-transitory storage media embodying software operable when executed by one or more computer systems to:
receive, at an agent of a server, a notification that a universal serial bus (USB) attached small computer system interface (SCSI) protocol (UASP) device (UASP device) has been connected to a client, wherein the notification comprises a client device UASP version associated with the UASP device;
create by the agent a virtual storage device associated with the UASP device;
retrieve an operating system version;
determine if the operating system supports UASP; and
advertise to the operating system by a virtual disk enumerator that the virtual storage device has one or more capabilities associated with an advertised UASP version, wherein the advertised UASP version is based, at least in part, on the supported UASP version.

16. The media of claim 15, wherein the determination is based, at least in part, on comparing the operating system version to a list of operating systems that support UASP.

17. The media of claim 15, wherein the software is further operable when executed to:
handle by the virtual disk enumerator requests to the virtual storage device in compliance with the advertised UASP version.

18. The media of claim 15, wherein the software is further operable when executed to:
retrieve by the virtual disk enumerator from the agent the client device UASP version.

19. The media of claim 18, wherein the determination is based, at least in part, on comparing the client device UASP version to a UASP version supported by the operating system.

20. The media of claim 15, wherein the supported UASP version is retrieved via an application programming interface.

\* \* \* \* \*